Oct. 27, 1959  J. E. CANDLIN, JR., ET AL  2,910,014
SUSPENSION SYSTEM SADDLE SUPPORT
Filed March 16, 1956  3 Sheets-Sheet 1

INVENTORS
JAMES E. CANDLIN JR.
ROBERT W. LANMAN
WILLIAM VAN DER SLUYS
BY Cromwell, Greist & Warden ATTORNEYS

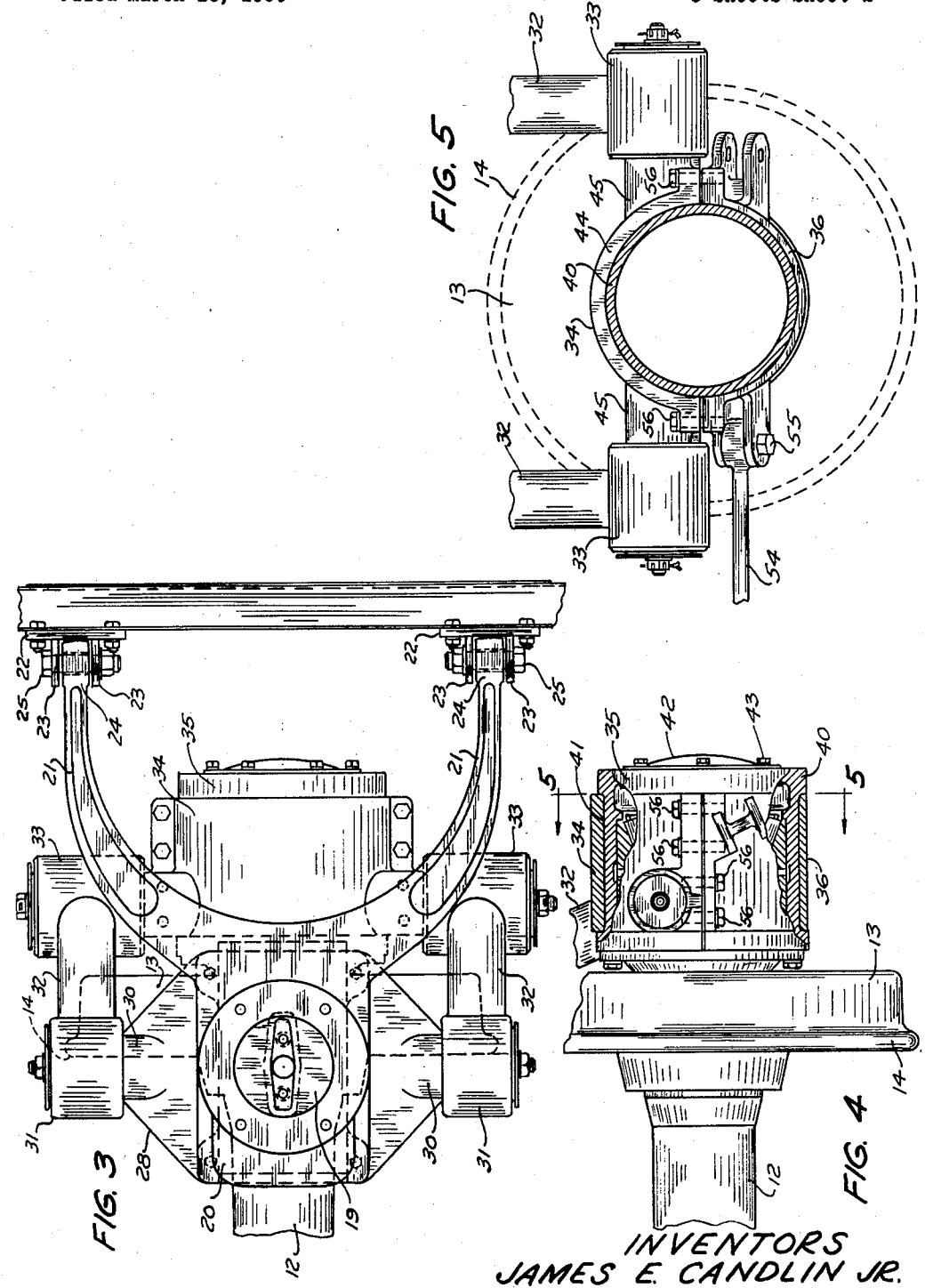

Oct. 27, 1959    J. E. CANDLIN, JR., ET AL    2,910,014
SUSPENSION SYSTEM SADDLE SUPPORT

Filed March 16, 1956    3 Sheets-Sheet 3

INVENTORS
JAMES E. CANDLIN JR.
ROBERT W. LANMAN
WILLIAM VAN DER SLUYS
BY Cromwell, Greist & Warden ATTORNEYS United States Patent Office 2,910,014
Patented Oct. 27, 1959

2,910,014

SUSPENSION SYSTEM SADDLE SUPPORT

James E. Candlin, Jr., Lansing, Ill., Robert W. Lanman, Hammond, Ind., and William Van Der Sluys, Homewood, Ill., assignors to Pullman-Standard Car Manufacturing Company, Chicago, Ill., a corporation of Delaware Application March 16, 1956, Serial No. 571,867

9 Claims. (Cl. 105—218)

The present invention relates generally to a new and improved suspension system for use in supporting a vehicle body with respect to a wheel-carrying axle to allow the body to move relative to the axle upon the operation of the vehicle. More specifically, the present invention is directed to an improved suspension system which includes the use of a saddle support adapted for attachment to the journal boxes carried by a wheel-carrying axle in support of a railway car, which saddle support interconnects the suspension system of the car body to the journal boxes thereby transmitting the weight of the car body and suspension system to the axle, the saddle support being readily removable from association with a journal box without the necessity of dismounting or disconnecting the suspension system thereby allowing the same to be maintained in its operative relation with the car body while the axle and its associated journal boxes are disassociated with the suspension system and car body for replacement or maintenance purposes.

In the manufacture of railway cars, the emphasis has been placed on the designing of lightweight cars of uncomplicated and standardized construction which may be used in the formation of train consists capable of operating at high speeds with lower maintenance costs. A form of lightweight, high speed railway car which has been developed and found to meet the aforementioned requirements utilizes a suspension system with which the saddle support, forming the essence of the present invention, is particularly adapted for use. However, it should be understood that the particular type of railway car and the specific form of suspension system to be described are merely illustrative of a single environment for use of the saddle support and it is not intended by limiting the following description to a particular form of suspension system and railway car, to limit the scope of the present invention. The basic principles and advantages residing in the use of a saddle support and the particular embodiment to be described may readily be used with other forms of suspension systems adapted for interconnection with journal boxes or other similar means carried by a vehicle body supporting axle.

In conventional railway car design the car bodies are supported by a plurality of trucks which are provided with at least one axle carrying spaced wheels and journal boxes with which the suspension systems of the car body are associated. In existing designs the trucks are normally manufactured as a complete unit and carry the suspension system of the car body. When it is desired to repair the truck itself as, for example, by replacement of axles or the re-working of the same, it is normally necessary to remove the entire truck assembly from association with the car body and dismount the suspension system to allow removal of the axle. In many instances it is necessary to dismantle the various elements of the suspension system and upon the completion of repair or replacement of the axle, the suspension system must be re-assembled within the truck and the truck ultimately replaced in its supporting relation with the car body. As may be readily apparent, such maintenance procedures are costly and require the use of specially trained personnel.

It is an object of the present invention to provide an improved suspension system for mounting a vehicle body with respect to a wheel-carrying axle, which system is interconnected with the vehicle body and load-bearing means carried by the axle, the interconnection between the suspension system and the load-bearing means carried by the axle being improved to allow disassembly of the axle with respect to the suspension system without the necessity of dismantling any single element or elements of the suspension system or disconnecting the same with respect to the vehicle body.

Another object in conjunction with the foregoing is to provide a saddle support particularly adapted for mounting with respect to a journal box carried by a wheel-carrying axle, which saddle support transmits the weight of a car body through its suspension system to the axle and allows the axle to be removed from association with the suspension system and car body without the necessity of dismantling the suspension system or disconnecting it with respect to the car body.

A further object in line with the foregoing is to provide a saddle unit adapted for mounting with respect to a journal box, which saddle unit comprises detachable members each of which are adapted to perform a useful function in the operation of a railway car.

Other objects not specifically set forth will become apparent from the following detailed description made in conjunction with the drawings wherein:

Fig. 3 is an enlarged fragmentary top plan view of a side assembly of the suspension system being taken generally along line 3—3 of Fig. 1;

Fig. 4 is an enlarged fragmentary side elevation partly broken away and in section of one end of a wheel-carrying axle illustrating the mounting of the saddle support on a journal box carried thereby;

Fig. 5 is a fragmentary and partially schematic sectional view taken generally along line 5—5 of Fig. 4, the conventional bearings and associated elements of the journal box not being illustrated for purposes of simplification;

Figure 2:
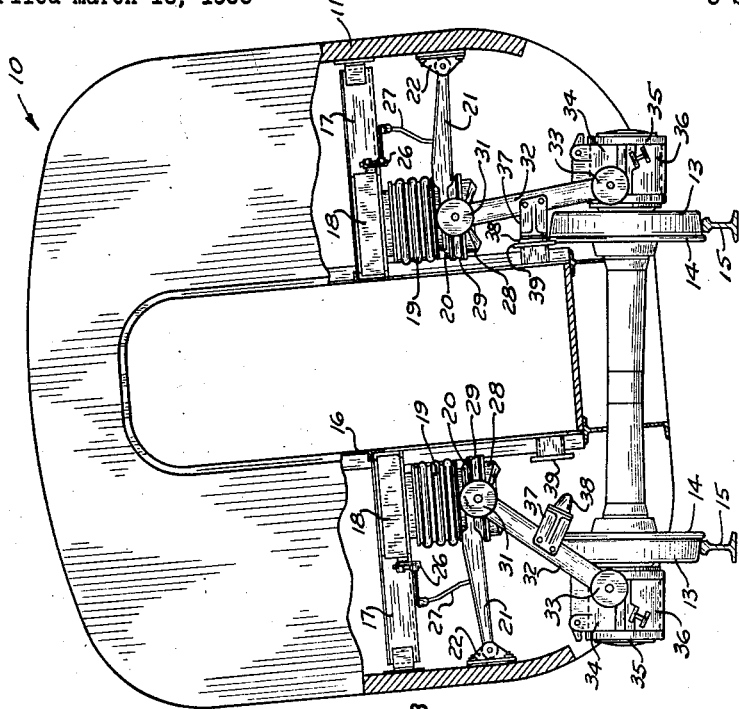
Fig. 2 is a view similar to Fig. 1 illustrating the functioning of the suspension system during operation of the railway car.
Figure 1:
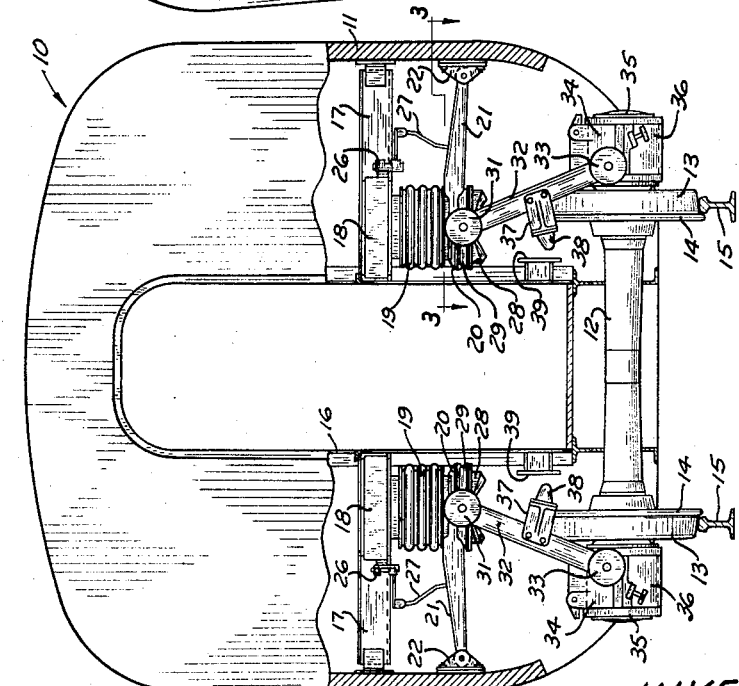
Fig. 1 is an end elevation partly broken away and in section of a form of lightweight, high speed railway car utilizing a suspension system of the type particularly adapted for incorporation of the saddle support of the present invention.
Figures 6, 7:
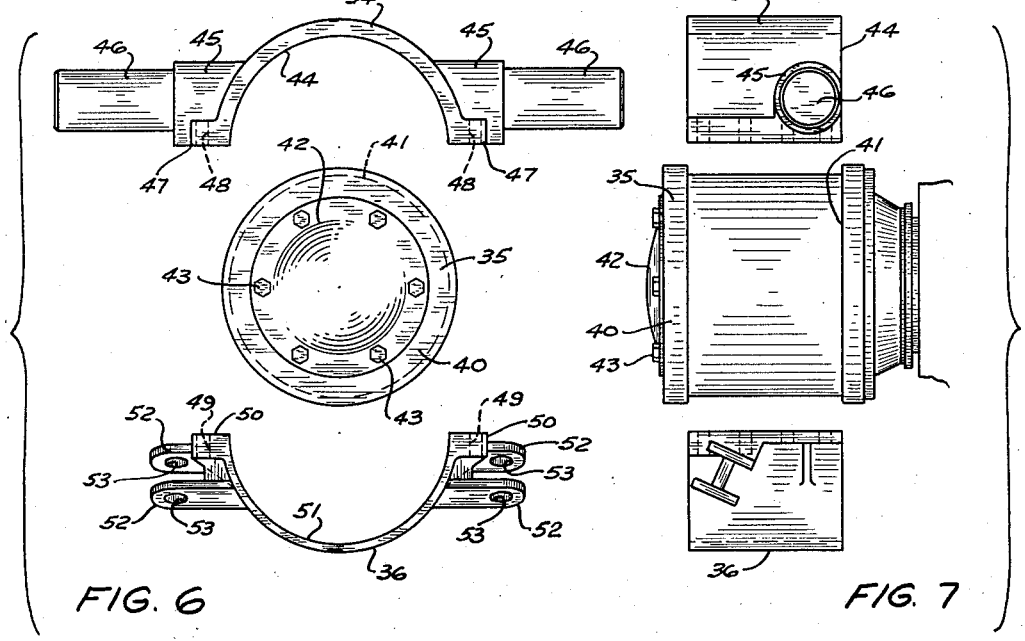
Fig. 6 is an exploded end elevational view illustrating the relation of the saddle support with respect to a journal box prior to the interconnection therebetween.
Fig. 7 is a fragmentary exploded side elevational view similar to the arrangement of Fig. 6.

In Figs. 1 and 2, a lightweight, high speed railway car 10 is shown which is provided with a car body 11 mounted by means of the suspension system on an axle 12. Laterally spaced wheels 13 on the axle 12 are provided with flanges 14 cooperating with the inner surfaces of laterally spaced rails 15. The railway car 10 is of the single axle variety having the axle 12 positioned near one of its ends, the remaining end being maintained by an adjacent car in load-bearing support. The end of the car 10 shown is provided with a passageway frame 16 which carries transversely extending supporting beams 17 which are interconnected with the inner surfaces of the shell of the car body 11. The suspension system about to be described consists of a pair of identical assemblies which are symmetrically arranged upon either side of the passageway frame 16. For purposes of explanation corresponding elements of each of these assemblies are identified by the same reference numerals.

The supporting beams 17 each carry a fluid pressure reservoir 18 which is interconnected with the upper end of upright resilient support means or fluid pressurized springs 19. The lower portions of the springs 19 are attached to yokes 20 which are provided with outwardly directed, laterally spaced arms 21 in the form of wishbones which are pivotally attached to brackets 22 carried by the inner surfaces of the shell of the car body 11. As shown in Fig. 3 the brackets 22 are provided with spaced ears 23 which receive therebetween an eye 24 which is pivotally connected with the ears 23 by means of a pin or bolt 25, which is preferably rubber bushed to reduce noise and vibrations, extending through aligned holes in the associated elements. This arrangement allows the yokes 20 to pivot in a generally vertical direction about the pivot points defined by the bolts 25 and restricts the yokes 20 from moving longitudinally of the car body 11. As a result, the springs 19, which are vertically compressible and expandable and act as weight supporting springs and shock absorbers, are allowed to compress or expand in a vertical direction in response to variations in loads carried by the car 10. The fluid pressure utilized to regulate the supporting force maintained by the springs 19 to control the relation of the car body 11 with respect to the axle 12, depending upon the total load carried by the car body 11, is supplied to the reservoirs 18 from a suitable source (not shown) through leveling valves 26 which are controlled by valve linkages 27 connected with a restraining arm 21.

The fluid preferably used is pressurized air supplied by an air compressor carried at some point in the train consist and the amount of pressure supplied to the air springs 19 is controlled by the leveling valves 26 through their operating linkages 27. As the weight of the car 10 increases the air springs 19 are compressed and the car body 11 moves downwardly toward the axle 12. Due to the presence of elements to be described, the bottom portion of the air springs 19 are supported to bring about compression thereof and the restraining arms 21 remain substantially in a horizontal plane. Consequently, movement of the leveling valves 26 downwardly cause the operating linkages 27 to open the valves 26 thereby supplying increased air pressure to the reservoir 18 and air springs 19 from the pressure source to expand the air springs 19 and thereby ultimately return the car body 11 to its original position with respect to the axle 12. Upon a reduction in total weight of the car body 11, the leveling operation is reversed. From this arrangement it can be readily seen that the vertical positioning of the car body 11 with respect to its axle 12 is automatically controlled by the elements described.

The car 10 is designed to have a low center of gravity to allow the same to negotiate curves at high speeds in a safe manner. To provide a comfortable ride, particularly during the negotiation of curves at high speeds, the car 10 is further provided with means allowing the same to bank into the curve and automatically right itself following the completion of the negotiation of the curve. To bring this about, the suspension system of the car body 11 is provided with pivotal points which allow car body 11 to bank or roll with respect to the axle 12 in response to the action of centrifugal force on the car body 11 when the same is rounding a curve. To further aid in allowing the car 10 to travel at high speeds, particularly when negotiating curves, the suspension system is provided with means which allow the axle 12 to limitedly turn in a horizontal plane with respect to the longitudinal center line of the car body 11 thereby allowing positive steering action to eliminate the tendency of the wheel flanges 14 to climb the rails 15.

To establish the aforementioned arrangement, reinforced plates 28 are associated with the bottom portion of air springs 19 and carry resilient rubber cushions 29 between the top surfaces thereof and the yokes 20. The plates 28 are provided with oppositely directed trunnions 30 which are received within cylindrical sleeve housings 31 of downwardly and outwardly extending suspension struts 32. The lowermost ends of the suspension struts 32 are provided with similar cylindrical sleeve housings 33 which are attached to a saddle member 34 received about the upper outer surface of a journal box 35. Additional saddle members 36 are received about the lower outer surface of each of the journal boxes 35 and are fastened to the saddle members 34 to substantially encase the outer annular surface of the journal boxes 35 and maintain the suspension system in operative association therewith. The structural features and advantages of the saddle support comprising the saddle members 34 and 36 will subsequently be described.

Each of the cylindrical sleeve housings 31 and 33 of the struts 32 internally maintains a rubber torsion sleeve assembly which cooperate with one another to resiliently bias the car body 11 into an upright position. In order to provide body roll or lateral movement to the car body 11 upon the rounding of a curve, thereby allowing the car body 11 to bank into the curve, the torsion units carried by the cylindrical sleeve ends 31 and 33 are resiliently rated to be overcome with respect to their biasing action by the action of centrifugal force on the car body 11.

As shown in Fig. 2 the car 10 is illustrated as rounding a curve extending to the left, as viewed, and centrifugal force acting on the car body 11 causes the same to bank by reason of the rubber torsion sleeve assemblies carried by the cylindrical end housings 31 and 33 having their inherent resiliency or biasing strength temporarily overcome. The fixed positioning of the restraining arms 21, in a lateral sense, maintains the air springs 19 substantially parallel to the vertical center line of the car body 11. As a result, the car body 11 pivots or rolls about the pivot points defined by the ends of the struts 32 and these struts are moved in a clockwise direction with respect to either of their pivotally connected ends. The action of centrifugal force thus causes the car body to bank into the curve.

To limit the total degree of bank regardless of the magnitude of the centrifugal force acting upon the car body 11, lateral movement control means 37 are carried by each of the struts 32 and positioned at substantially their longitudinal midpoints. The lateral movement control means 37 are provided with resilient rubber abutment bumpers 38 which, upon continued banking of the car body 11, ultimately contact abutment stop plates 39 carried by the outer surfaces of the passageway frame 16. As shown in Fig. 2, the car body 11 banking to the left is ultimately limited as to the total degree of bank by abutment of the rubber bumpers 38 with the abutment stop plates 39 mounted on the right hand side of the passageway frame 16. As a result of the combined use of rubber torsion sleeve assemblies in the interconnected ends of the struts and the lateral movement control means 37, the car body 11 is allowed to bank into a curve and the total degree of bank provided by the action of centrifugal force is maintained within the limits of riding safety and comfort.

Upon the completion of the negotiation of a curve, the rubber torsion sleeve assemblies carried by the ends of the struts 32 again assert their biasing action on the car body 11 as the magnitude of centrifugal force becomes sufficiently decreased and the car body 11 is returned to its upright position automatically and smoothly. Due to this particular arrangement of allowing lateral body roll or banking, the comfort of the passengers during high speed operation is greatly improved and curves may be negotiated with safety at higher speeds of operation.

Referring particularly to Figs. 4-9, the saddle support previously referred to will be described. The journal boxes 35 are each formed from an outer housing 40 which is cylindrical; being provided about the outer surface thereof with an annular groove 41 which is adapted to receive the saddle members 34 and 36. The elements carried internally of each journal box 35 are conventional in design and arrangement and generally consist of a plurality of roller bearings in journaling relation with the axle 12 backed up by suitable bearing plates and a source of lubricant. The outer end of each journal box 35 is provided with a cover plate 42 suitably held in place by spaced bolts 43; the cover plate 42 being removable for the purpose of gaining access into the interior of the journal box housing 40.

The saddle member 34 is formed from a body portion 44 which is of generally arcuate shape being provided with oppositely directed, integrally formed trunnions 45 which are externally relieved toward their ends to form torsion sleeve assembly mounting portions 46. The portions 46 and their torsion sleeve assemblies are each received within a cylindrical sleeve housing 33 of a strut 32 as shown in Fig. 5. The torsion sleeve assemblies carried by the cylindrical sleeve housings 33 affect the pivotal action between the struts 32 and the journal box 35 and cooperate with the biasing action of the torsion units mounted in the sleeve housings 31 to urge the car body 11 into an upright position.

The form of saddle support shown in Figs. 4-7 includes the use of a top saddle member 34 and a bottom saddle member 36 which are fastened with one another about the outer surface of a journal box 35. The saddle member 34 has on either side thereof an outwardly directed flange 47 formed integral with the main body portion 44. The flanges 47 are provided with drilled holes 48 which are adapted to be aligned with drilled holes 49 carried in outwardly directed flanges 50 carried on either side of a main arcuate body portion 51 of the bottom saddle member 36. The flanges 50 are integral with the upper ends of the body portion 51 and extend outwardly therefrom to abut the flanges 47 carried by the top saddle member 34. The body portion 51 of the bottom saddle member 36 is adapted to be received in the lower half of the groove 41 of a journal box 35. The outer surface of the body portion 51 is provided with integral, outwardly directed, spaced ears 52 on either side thereof. The spaced ears 52 are provided with aligned holes 53 and are adapted to receive therebetween in pivotal interconnection therewith, an element 54 of an axle steering mechanism as shown in Fig. 5. The element 54 may be a steering rod which is suitably interconnected with other axle steering elements to turn the axle 12 with respect to the car body 11 in response to relative lateral turning movement between interconnected cars. The end of the steering rod 54 is held in place between the ears 52 by means of a pin or bolt 55 which allows the steering rod to pivot relative to the bottom saddle member 36.

The saddle members 34 and 36 are assembled with respect to a journal box 35 by being received within the groove 41 and clamped in place by bolts 56 passed through the aligned apertures 48 and 49 as shown in Figs. 4 and 5. As a result of this arrangement, the suspension system is interconnected with the axle 12 to support the car body 11 with respect thereto and a suitable axle steering arrangement is attached with respect to the axle 12 to steer the same in response to lateral relative turning movement between adjacent interconnected cars 10. In the event that it is necessary to re-work the axle 12 or repair or service the journal boxes 35 or wheels 13, it is necessary merely to remove the bolts 56 at which point the bottom saddle member 36 may be readily disassociated with the journal box 35 without the necessity of disconnecting any elements of the steering mechanism attached thereto. Similarly, with respect to the top saddle members 34, the weight of the car body 11 and associated suspension system may be readily removed from association with the journal boxes 35 and axle 12 by lifting the top saddle members 34 to an extent that the axle 12 with associated journal boxes 35 is completely clear from the top saddle members 34. In carrying this out it is unnecessary to disconnect any elements of the suspension system either with respect to the car body 11 or with respect to one another or the top saddle members 34. No elements are maintained in operative association with the journal boxes 35 or axle 12 which must be disassembled or removed prior to the carrying out of the servicing of the axle 12 or journal boxes 35.

In re-assembling the axle 12 with the car body 11 it is necessary merely to reverse the procedure previously described and bring the top saddle members 34 back into contact with the top portion of the grooves 41 of the journal boxes 35, properly seat the bottom saddle members 36 with the steering mechanism still intact and interconnect the two saddle members by replacing the bolts 56. Upon completion of the re-assembling operation the car 10 is immediately ready for operation.

By completely surrounding the journal boxes 35 with the saddle supports, any forces applied thereto through the element 54 of the axle steering mechanism will be uniformly distributed throughout the top and bottom saddle members. Steering action will take place upon the forward or rearward movement of the steering element 54 by reason of the pliable inter-connection afforded by the resilient cushions 29 mounted between the yokes 20 and plates 28. The cushions 29 generally bias the axle 12 into a squared-off position with respect to the car body 11 but, upon the subjection of the ends of the axle 12 to steering forces, the biasing action of the cushions 29 may be overcome and the axle 12 turned in a horizontal plane relative to the longitudinal center line of the car body 11. Upon relaxation of the steering forces the biasing action of the resilient cushions 29 will again assert themselves to an extent that the axle 12 will be automatically returned to its original position. The cushions 29 further absorb the lateral components of impact forces transmitted axially of the struts 32 to prevent the transmission of these components into the body structure through the restraining arms 21.

Figures 8, 9:
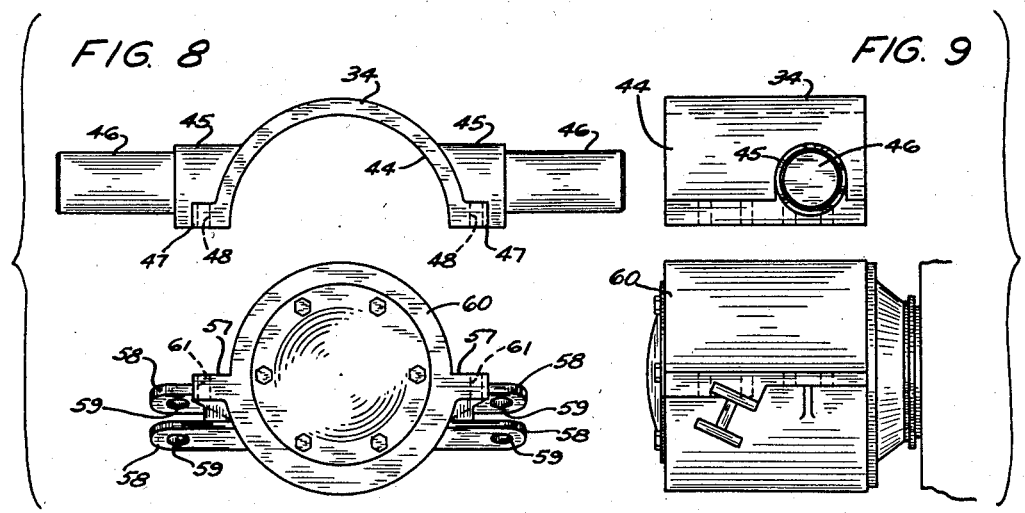
Fig. 8 is an exploded end elevational view of a modified arrangement of the saddle support and journal box.
Fig. 9 is a fragmentary exploded side elevational view of the arrangement of Fig. 8.

Figs. 8 and 9 illustrate a modified form of saddle support. In these figures a modified journal box 60 is shown as being provided with oppositely directed flanges 57 and oppositely directed pairs of spaced ears 58 carrying aligned holes 59; these elements being formed integral with the outer surface of the journal box. The upper portion of the outer surface of the journal box 60 receives the top saddle member 34 previously described. The side flanges 47 of the top saddle member 34 abut the flanges 57 of the journal box 60 and the drilled hole 48 in the flanges 47 become aligned with drilled holes 61 in the flanges 57 to receive bolts therethrough to attach the top saddle member 34 with the journal box 60. In this particular arrangement the saddle unit comprises merely a top saddle member 34 which functions and is interconnected with the suspension system in exactly the same manner as previously described. The axle steering mechanism is directly attached to the journal box 60 by means of interconnecting an element thereof with the spaced ears 58 similar to the manner of interconnection previously described. In the event that axle steering is used in connection with the journal box 60 and it is desired to dismount the axle 12 and journal boxes 60 associated therewith, the top saddle member 34 will be removed in exactly the same manner as previously described but it will be necessary to disconnect the axle steering element from its association with the journal box 60 to completely free the same and the axle 12 for maintenance or replacement purposes.

Certain modifications and changes in the foregoing embodiment may be made without departing from the spirit and scope of the invention, and, therefore, only such limitations should be imposed as are indicated in the appended claims.

We claim:

1. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a saddle member carried by the top surface of each of said journal boxes, each of said saddle members being attached to and detachable from a journal box by means forming a part of said saddle member and said journal box to free said axle from the weight of said vehicle body while maintaining saddle member attachment to said suspension system.

2. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a saddle member carried by the top surface of each of said journal boxes, each of said saddle members being attached to and detachable from a journal box by means forming a part of said saddle member and said journal box to free said axle from the weight of said vehicle body while maintaining saddle member attachment to said suspension system, each of said saddle members having an inner surface of a configuration corresponding to the upper outer surface of a journal box.

3. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a saddle member carried by the top surface of each of said journal boxes, each of said saddle members being attached to and detachable from a journal box by means forming a part of said saddle member and said journal box to free said axle from the weight of said vehicle body while maintaining saddle member attachment to said suspension system, each of said saddle members being provided with stub shaft means which are engaged by the lower ends of said laterally acting means to pivotally interconnect the same.

4. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a saddle member carried by the top surface of each of said journal boxes, each of said saddle members being attached to and detachable from a journal box by means forming a part of said saddle member and said journal box to free said axle from the weight of said vehicle body while maintaining saddle member attachment to said suspension system, each of said saddle members being provided with oppositely directed stub shaft means which are engaged by the lower ends of one of said laterally acting means to pivotally interconnect the same, each of said stub shaft means including a torsion unit interconnected with the lower end of the laterally acting means to provide the same with limited resilient pivotal movement with respect to said saddle member.

5. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a journal box saddle support carried by each of said journal boxes, said saddle supports being attached to and detachable from said journal boxes by means forming a part of said saddle supports and said journal boxes to free said axle from the weight of said vehicle body while maintaining saddle support attachment to said suspension system, each of said saddle supports including a top and bottom member detachably connected to one another to surround a journal box, the top member being attached to one of said laterally acting means.

6. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a journal box saddle support carried by each of said journal boxes, said saddle supports being attached to and detachable from said journal boxes by means forming a part of said saddle supports and said journal boxes to free said axle from the weight of said vehicle body while maintaining saddle support attachment to said suspension system, each of said saddle supports including a top and bottom member detachably connected to one another to surround a journal box, the top member being attached to one of said laterally acting means and being provided with trunnions which are engaged by the lower ends of the laterally acting means to pivotally interconnect the same.

7. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral movement of said vehicle body relative to said axle, the lower ends of each of said laterally acting means being attached to journal boxes carried by said axle near the ends thereof through a journal box saddle support carried by each of said journal boxes, said saddle supports being attached to and detachable from said journal boxes by means forming a part of said saddle supports and said journal boxes to free said axle from the weight of said vehicle body while maintaining saddle support attachment to said suspension system, each of said saddle supports including a top and bottom member detachably connected to one another to surround a journal box, the top member being attached to one of said laterally acting means and being provided with trunnions which are engaged by the lower ends of the laterally acting means to pivotally interconnect the same, each of said trunnions including a torsion unit interconnected with the lower end of the laterally acting means to provide the same with limited resilient pivotal movement with respect to said saddle support.

8. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a journal box saddle support carried by each of said journal boxes, said saddle supports being attached to and detachable from said journal boxes by means forming a part of said saddle supports and said journal boxes to free said axle from the weight of said vehicle body while maintaining saddle support attachment to said suspension system, each of said saddle supports including a top and bottom member detachably connected to one another to surround a journal box, the top member being attached to one of said laterally acting means and being provided with trunnions which are engaged by the lower ends of the laterally acting means to pivotally interconnect the same, said bottom member being provided with attaching means for pivotal interconnection with an element of an axle steering mechanism and being readily detachable from its journal box while maintaining its interconnection with said element.

9. A suspension system for supporting a vehicle body on a wheel-carrying axle, said system including laterally spaced vertically acting resilient means connected to said vehicle body, restraining means connected with said resilient means and said body to substantially limit movement of said resilient means longitudinally of the vehicle body, laterally acting means connected to and extending between said resilient means and said axle to control lateral body roll movement of said vehicle body relative to said axle, the lower ends of each of said laterally acting means being attached to journal boxes carried by said axle near the ends thereof through a journal box saddle support carried by each of said journal boxes, said saddle supports being attached to and detachable from said journal boxes by means forming a part of said saddle supports and said journal boxes to free said axle from the weight of said vehicle body while maintaining saddle support attachment to said suspension system, each of said saddle supports including a top and bottom member detachably connected to one another to surround a journal box, the top member being attached to one of said laterally acting means and being provided with trunnions which are engaged by the lower ends of the laterally acting means to pivotally interconnect the same, each of said trunnions including a torsion unit interconnected with the lower end of the laterally acting means to provide the same with limited resilient pivotal movement with respect to said saddle support, said bottom member being provided with attaching means for pivotal interconnection with an element of an axle steering mechanism and being readily detachable from its journal box while maintaining its interconnection with said element.

References Cited in the file of this patent

UNITED STATES PATENTS

| | | |
|---|---|---|
| 1,822,347 | Hektner | Sept. 8, 1931 |
| 2,177,893 | Krotz | Oct. 31, 1939 |
| 2,193,046 | Strauss | Mar. 12, 1940 |
| 2,217,034 | Van Dorn | Oct. 8, 1940 |
| 2,242,422 | Eksergian | May 20, 1941 |
| 2,286,608 | Eksergian | June 16, 1942 |
| 2,377,883 | Hickman | June 12, 1945 |
| 2,426,513 | Linn | Aug. 26, 1947 |
| 2,685,845 | Gassner et al. | Aug. 10, 1954 |
| 2,687,099 | MacVeigh | Aug. 24, 1954 |
| 2,777,402 | Rossell | Jan. 15, 1957 |
| 2,785,640 | Furrer | Mar. 19, 1957 |
| 2,812,726 | Bock et al. | Nov. 12, 1957 |

FOREIGN PATENTS

| | | |
|---|---|---|
| 157,620 | Australia | July 13, 1954 |
| 406,231 | Great Britain | Feb. 22, 1934 |